Patented Apr. 10, 1951

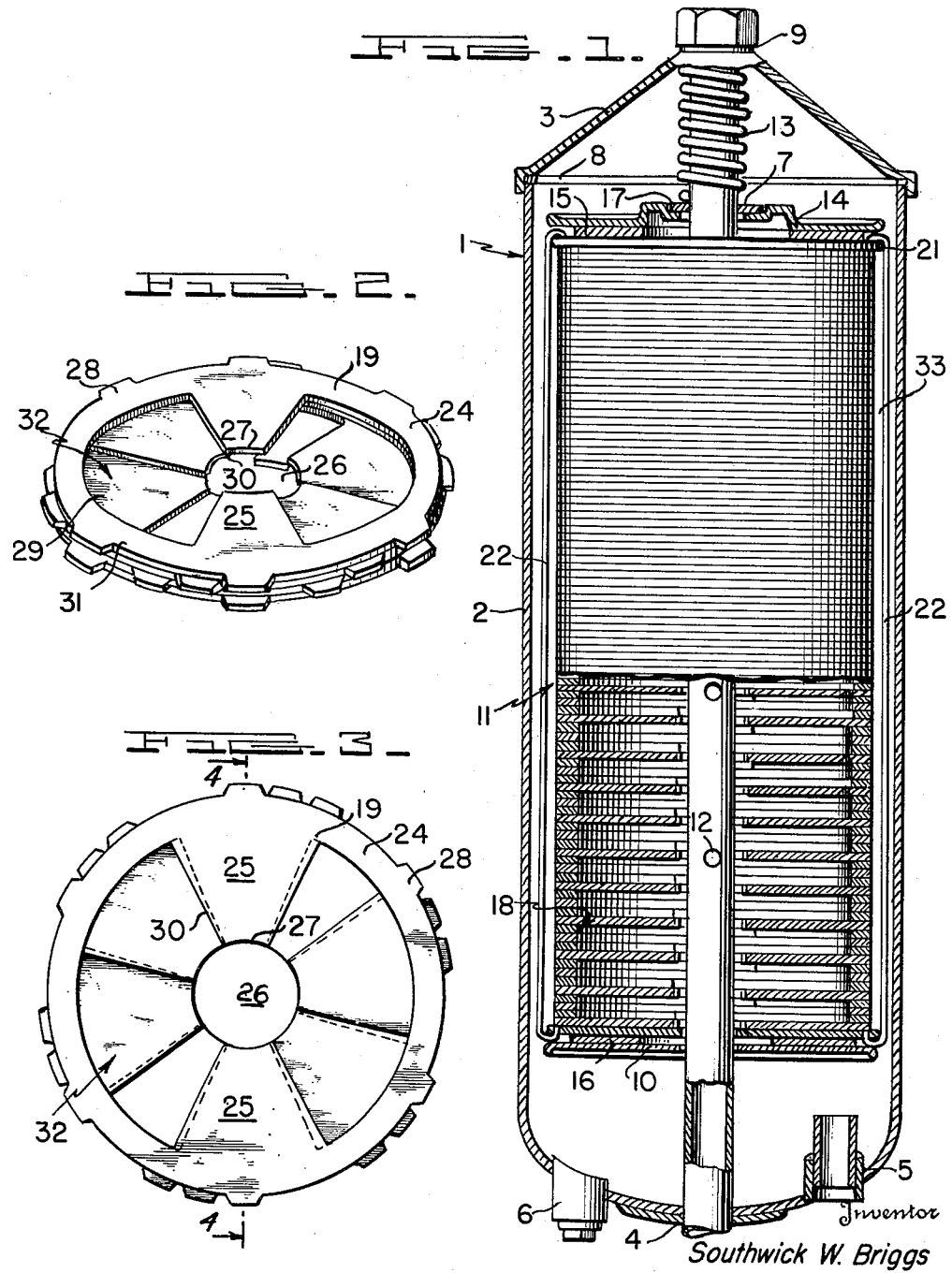

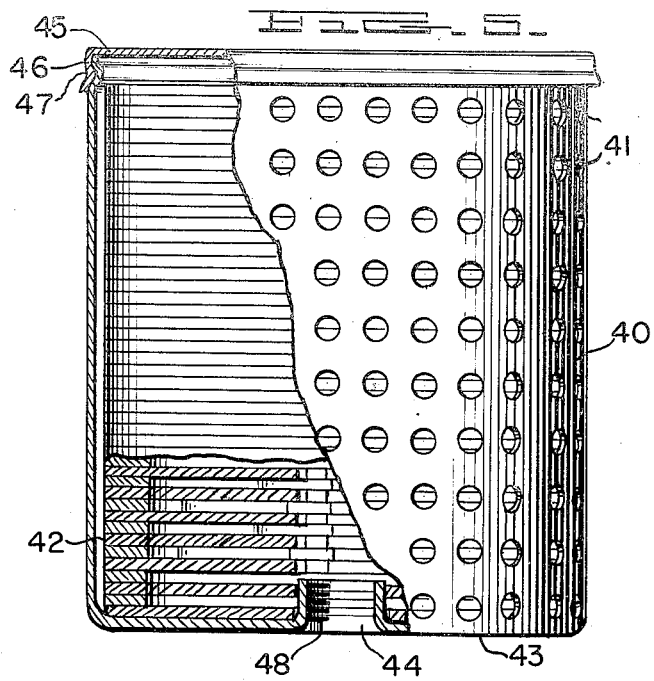
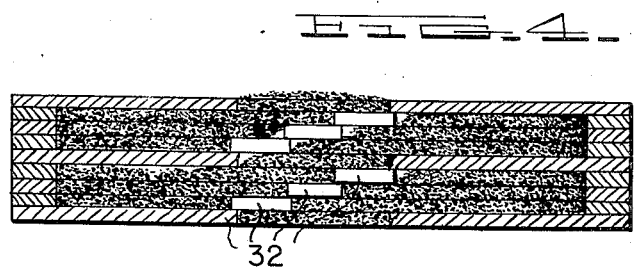
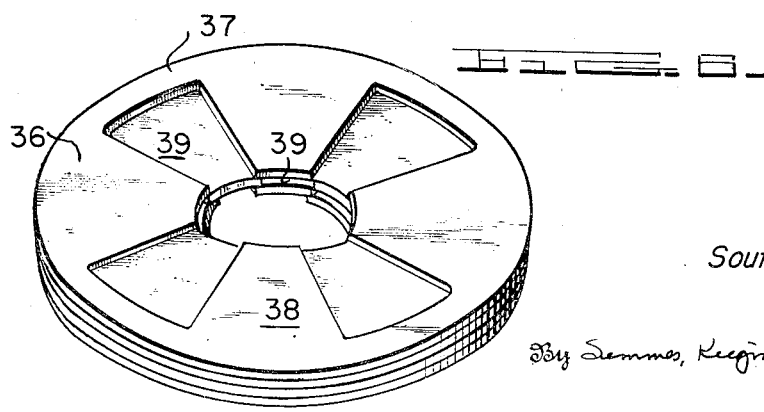

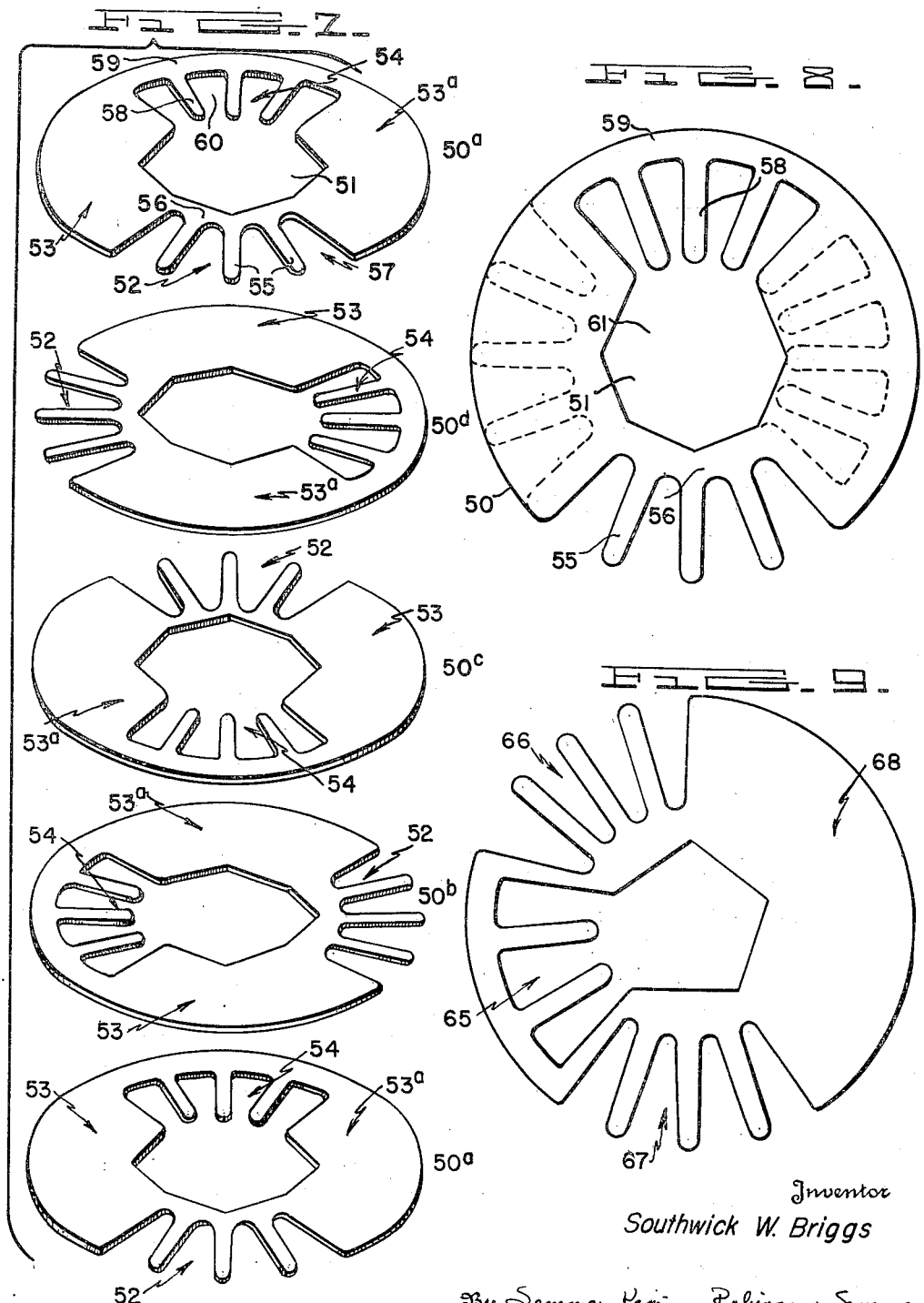

2,548,584

UNITED STATES PATENT OFFICE 2,548,584

FILTER CARTRIDGE

Southwick W. Briggs, Bethesda, Md.

Application March 26, 1948, Serial No. 17,278

2 Claims. (Cl. 210—169)

This invention relates to a filter cartridge and a method of making a filter cartridge having a high capacity.

There has been a continued development of filters primarily for use with internal combustion engines which occupy a small volume and yet have a high flow capacity. It is especially desirable in automotive and other portable equipment that the filter occupy a small space. It is further desirable that a filter have a large dirt capacity in view of the absence of any regular maintenance schedule for automotive equipment.

In an effort to provide a filter having the above characteristics, filter elements composed of a number of discs of several types stacked in a regularly recurring series have been provided. Filters of this type have a large surface area for a given volume and, consequently, have a high flow rate when clean. However, after a small quantity of solids have been separated from the fluid being filtered, the pressure drop across the filters heretofore available increases rapidly and the rate of filtration correspondingly drops. Moreover, the increased pressure drop across the filter element caused by the deposition of solids on the filter material tends to increase the density of the filter medium and further increase the resistance to flow.

When the disc type structures are constructed of a number of different configurations, a problem in stacking the discs to form the filter element arises. It is necessary to stack the discs in a definite order and often it is also necessary to align each disc in a certain position with respect to discs of other types. It then becomes necessary either to provide extremely complicated machinery for stacking the discs or to stack them by hand, which seriously increases the cost of manufacturing the filter elements. Since, in most cases, the filter element is replaced a number of times during the life of a clarifier, it is essential that the cost of the re-fill be kept as low as possible.

It is an object of this invention to provide a fluid clarifier capable of clarifying fluids passing therethrough at a high rate of flow.

It is also an object of this invention to provide a clarifier element which will effectively remove impurities from the fluid being filtered.

Another object of this invention is to provide a filter element which may be prepared rapidly at a low cost with inexpensive machinery.

A further object of this invention is to provide a new method of constructing filter elements.

Still another object of this invention is to provide a clarifier having the capacity to separate large amounts of solids from the fluid before it is necessary to replace the clarifier element.

With these and other objects in mind, this invention resides in a number of discs of filter material having a single configuration stacked to form a tubular filter element. The discs are rotated during the stacking to provide a structure in which each disc is angularly displaced from the adjacent discs.

In the drawings:

Figure 1 is a longitudinal cross section of a fluid clarifier constructed according to this invention;

Figure 2 is a perspective view of a series of discs illustrating the preferred form of this invention;

Figure 3 is a plan view of the discs illustrated in Figure 2;

Figure 4 is a sectional view along the section line 4—4 in Figure 3 after extended use of the clarifier;

Figure 5 is an elevation, partially in section, of a filter cartridge illustrating a modified form of this invention;

Figure 6 is a perspective view similar to Figure 2 of the discs stacked in the form of the invention illustrated in Figure 5;

Figure 7 is an exploded, perspective view of a modified form of the invention;

Figure 8 is a plan view of the form of the invention illustrated in Figure 7; and Figure 9 is a plan view of a disc which may be employed in the filters illustrated in Figures 7 and 8.

Referring to Figure 1, a clarifier is illustrated having a casing, indicated generally by 1, composed of a base 2 closed at its upper end by a top 3. An inlet tube 4 passes through the lower end of the base 2 of the casing and extends upwardly through the major portion of its length. An outlet 5 is provided for discharging the clarified fluid after it is passed through the clarifier. Casing 2 is also equipped with a drain plug 6 for the removal of any sediment which may collect in the sump at the bottom of the base 2 of the casing 1.

In the clarifier structure illustrated in Figure 1, the inlet tube 4 extends up through the casing for engagement with a bolt 7 passing through the top 3. Inlet tube 4 is internally threaded at its upper end for engagement with the bolt which, on tightening, holds top 3 firmly against the upper edge of the lower portion of the casing 2. A gasket 8 prevents leakage between the lid and the lower portion of the casing. Similarly, a gasket 9 prevents leakage through the top 3 at the point where bolt 7 passes therethrough.

A flange 10 is welded to inlet tube 4 at its lower end to support a clarifier cartridge indicated generally by 11. Inlet tube 4 is apertured at 12 above flange 10 to allow the fluid to flow into the clarifier cartridge 11. In order to hold the clarifier cartridge 11 securely in place, a compressed helical spring 13 around bolt 7 presses against a movable plate 14. Plate 14 in turn bears against the filter cartridge 11 to hold it firmly in place between that plate and flange 10. Gaskets 15 and 16 prevent by-passing of unclarified fluid around the clarifier cartridge 11 at the upper and lower ends of the cartridge 11, respectively. A gasket 17 between the spring 13 and plate 14 fits tightly against bolt 7 to prevent leakage between it and plate 14.

Clarifier cartridge 11 consists of a filter element 18 formed by a series of discs 19 stacked to form a tubular structure. The filter element is bounded at its ends by rigid plates 20 and 21. Plates 20 and 21 are connected by any suitable means such as wires 22 which hold the plates together and maintain the discs in a compressed condition. The combination of the rigid plates 20 and 21 and the compressed condition of the discs forming the filter element gives a rugged structure which may be handled without fear of damaging the filter element.

Discs 19 are formed from any suitable filter material such as blotting paper, or papers prepared by the process described in Asplund Patent No. 2,008,892. Discs 19 preferably consist of an outer annulus 24 from which one or more webs extend inwardly towards the center of the disc. Webs 25 end short of the center of the disc to provide a central bore 26 of the filter element through which the inlet tube 4 of the filter casing passes. In many cases it will be desirable that webs 25 be sufficiently long to bear against the inlet tube 4 of the filter and thereby impart additional rigidity to the filter element. The ends 27 of the webs 25 may be an arc having its center at the center of the disc 19 as shown in the drawings or may be flat. Often certain advantages in the stacking of the discs can be obtained if the ends 27 are flat. For instance, the discs may be stacked on a polygonal mandrel (not shown) to aid in the positioning of the discs relative to one another. Discs 19 preferably have a plurality of ribs 28 extending a short distance from the outer surface of the annulus 24.

A disc 19 may have any number of webs 25, depending upon the particular filter material of which the disc is composed and the conditions under which the filter will operate. For example, if the filter material comprising the discs is weak, it will be desirable to provide a small number of relatively wide rather than a large number of long, thin webs.

The width of the webs 25, in degrees, will depend upon the number of webs and the number of spaces desired between vertically aligned webs in the filter element. In the particular form of the disc shown, web 25 occupies a sector of substantially 45°. The cutout space 29 between webs occupies approximately three times the area of the web, or 135°. In the actual construction of the discs illustrated in Figures 2 and 3, it is generally desirable to make the webs 25 slightly greater than a 45° sector. In this manner there will be a slight overlap indicated at 30 of one web over the edge of the web of the immediately adjacent disc. This overlap of the webs provides support for the webs and also increases slightly the dirt capacity of the filter element by allowing a continuous mass of dirt to build up. If the webs do not overlap, a slight displacement of a disc from the position it should occupy would leave the web unsupported and cause the dirt deposited on the web to taper in thickness towards the edges of the web.

In the construction of the filter element one disc 19 is placed on a suitable base. A second disc 19 is then placed on the top of the first disc, but the two discs are rotated relative to one another 45° as the second disc is placed in position. A third disc 19 is then placed on top of the second disc but is rotated 45° relative to the second disc as it is placed in position. This procedure is continued until a filter element of the desired length is formed. Clearly, the relative rotation may be produced by rotation of either the disc being added or the stack of discs.

The rotation of the discs produces a tubular structure having an annular wall 31 formed by the annuli 24 of the various discs extending the full length of the filter element. Extending inwardly from the annular wall 31 is a helical shelf indicated generally by 32 formed by the webs 25. In the form illustrated in Figure 2 the addition of 4 discs, and the 45° rotation of each of the discs as it is placed in position, will bring webs 25 of the 4th disc directly above the webs 25 of the first disc in the stack. There will, consequently, be a space separating the upper surface of the web of the first disc from the lower surface of the web of the fourth disc equal the thickness of three discs. This space formed by cutout spaces 29 and outlined by the wall 31 of the filter element and the webs 25 will have a stepwise helical shape and extend through the length of the filter element.

The number of webs extending from the annulus 24 and the depth of the space between similarly positioned webs in the stacked filter element can be varied at will. For example, suppose that a filter element having three shelves separated by the thickness of two discs is desired. The webs of the discs would then be made a little over 40° and the cutout areas between the webs would be 80°. On stacking these discs each disc would be rotated 40° relative to the immediately adjacent disc instead of 45° as was the case in the previous example. A filter element formed of discs stacked in this manner will have three helical shelves separated by the thickness of two discs throughout the length of the filter element. As mentioned above, actually it will be desirable to make the webs slightly greater than 40°, with a corresponding reduction in the area of the cutout area, to allow slight overlapping of the webs on stacking.

A clarifier element employing the idea of this invention in which the space separating vertically aligned webs is only the thickness of a single disc is illustrated in Figure 6. In Figure 6 discs 33 consist of an annulus 34 from which webs 35 extend. In this form, each disc has four webs, each of which occupies a sector of about 45°. Separating the webs 38 are cutout areas 39 which occupy approximately the same area as the webs.

During the stacking of discs 33 each disc is rotated 45° from the position occupied by the disc on which it is placed. There will, consequently, be a web 35 covering each cutout area 36 of the disc immediately below. The structure illustrated in Figure 6 provides a more rugged clarifier element but reduces the free volume within the clarifier element and correspondingly reduces its dirt capacity.

In operation, the fluid to be clarified enters the inlet 4 and passes up into the region above flange 10. The fluid then leaves the inlet tube through apertures 12 and flows into the clarifier element 18. The large free volume within the clarifier element greatly reduces the velocity of the fluid and provides a settling chamber in which solid particles settle from the fluid. The fluid may leave the clarifier element by a number of paths. It may pass directly through the annulus of the disc, in which it is filtered, and then drain from the outer surface into the region 33 within the casing surrounding the clarifier element. Another path is into the web 25 of the discs and thence through the filter material to the outer edge of the disc. The fluid may also separate adjacent discs very slightly and provide a path between the discs. The fibrous nature of the filter material composing the discs will strain any large particles from the fluid following this latter path.

The solids separated from the fluid are supported by the webs 25 and remain within the clarifier element. That portion of the fluid which enters the web 25 of the disc and then passes through the filter material flows in a direction which aids in the settling of the solids on the webs. Figure 4 illustrates the condition of a filter after extensive use. The fluid passing through the clarifier element drains from its outer surface into space 35 from which it is discharged through outlet 5.

Filtration may be continued until virtually the entire space between the webs is filled with the solid particles separated from the fluids. Whereas in the disc filters employing an outside-in flow which have hitherto been available, the presence of a volume of dirt equal to about 20% of the volume of the filter element will effectively plug the filter element and prevent flow therethrough, a filter of the type illustrated in Figures 1, 2, and 3 may be operated until solids equivalent to about 60% of the volume of the filter element have been separated. In the outside-in filters hitherto available the deposition of solids and an increase in pressure on the outside of the filter element increases the resistance to flow through the filter and ordinarily makes a pressure relief valve necessary. In the structure herein described an increase in pressure within the filter element tends to open the element to provide an inherent pressure release mechanism.

It is quite likely that in the operation of a filter of the type illustrated in Figures 1 through 4 that a by-pass is developed which permits the passage of a large portion of the fluid being filtered. This in turn further reduces the rate of flow of the liquid passing through the greater part of the filter element and increases its effectiveness as a settling chamber. Any by-pass that develops apparently is small enough to strain the fluid and does not seriously impair the filtering properties of the clarifier. Clarifiers of the type illustrated have been used in test runs until virtually the entire free volume within the filter element is filled with solids and yet the crankcase of the vehicle on which it was used was kept clean.

A modification of a filter cartridge employing this invention is illustrated in Figure 5. In this structure a container 40 having perforations 41 in its walls is provided for a clarifier element 42. Container 40 is provided with an imperforate bottom 43 having an inlet 44 for the fluid to be clarified. The upper end of container 40 is closed by an imperforate cover 45 which fits tightly on the container. Cover 45 may be held in place by any suitable means such as a lip 46 in container 40 engaged by a rim 47 on the cover 45.

A clarifier element is stacked within the container 40 in the manner described above. In the drawings, the clarifier element of the type illustrated in Figure 6 is shown in the container 40. This element has a single disc thickness separating vertically aligned webs of the discs. The clarifier element within container 40 is held in a compressed condition within the container by cover 45 to prevent by-passing of the filter material.

Inlet 44 of the container 40 is internally threaded for mounting on an inlet tube of a clarifier casing. If the clarifier cartridge illustrated in Figure 5 is employed, it is not necessary to provide the flange 10 shown in Figure 1. In addition, the inlet tube 4 need only extend far enough into the casing to provide a threaded section for engagement with the threads 48 in inlet 38.

The manner of operation of the form of the invention illustrated in Figure 5 is the same as that described above for the form illustrated in Figure 1. However, an increase in the pressure within the filter element in Figure 1 will allow compression of spring 13 and a slight opening of the clarifier element over its entire length. In the modification illustrated in Figure 5, an increase in pressure within the clarifier element will probably result in the formation of a small by-pass to relieve the excessive pressure. This modified form of the clarifier will also continue to function efficiently until the entire free volume is substantially filled with separated solids.

A modified form of the invention possessing the same advantages in regard to ease of stacking is illustrated in Figures 7, 8, and 9 of the drawings. This form of the invention in adapted for either outside-in or inside-out filtering, but will generally be used with the former method and is described herein as employed for outside-in filtration. When used for outside-in filtration the form of the invention illustrated in Figures 7, 8, and 9 should be used with the casing and means of support illustrated in Figure 1 and described above. Outlet 5 will then be used as an inlet to the casing and inlet tube 4 will be used to discharge the filtered fluid. Generally, it will be necessary to provide a pressure release mechanism of any conventional type to allow by-passing of the filter element when it becomes plugged.

The modified form of the filter consists of a plurality of discs 50 stacked to form a tubular filter element. Discs 50 have a central aperture 51, preferably in the shape of a regular polygon to facilitate alignment of the discs which, on stacking, form a central bore through the filter element. Discs 50 consist of a spacer sector 52, a filter sector 53, and a discharge sector 54 indicated generally in the drawings.

Spacer sector 52 consists of a number of fingers 55 extending outwardly from a rim 56 surrounding the central aperture 51 of the disc. The several fingers 55 outline channels 57 communicating with the space surrounding the filter disc. Channels 57 are closed at their inner end to prevent flow directly to the central aperture 51 by rim 56.

A filter sector 53 of the discs consists of a sheet of filter material extending continuously from the central aperture 51 to the outer edge of the disc. The area of the filter sector 53 is sufficient to cover the spacer sector 52 and in the form illustrated in the drawings is approximately 90°.

The discharge sector 54 of the disc has a plurality of fingers 58 extending inwardly to the central aperture 51 from an outer rim 59 adjacent the outer edge of the disc. Fingers 58 outline a plurality of channels 60 communicating with the central bore of the filter element formed by the alignment of central apertures 51 of the several discs.

Filter sectors 53 are located between the spacer sectors and the discharge sectors. In the form of the invention illustrated there are two filter sectors 53 and 53a, but only one spacer sector and one discharge sector in each disc. The spacer sector 52 and the discharge sector 54 are diametrically opposed and separated by filter sectors 53 and 53a.

In the formation of the filter element by stacking the filter discs 50, each disc 50 is rotated 90° from the position of the disc on which it rests. Referring to Figure 7 a series of discs 50 in the various positions which it may occupy in the tubular filter element is illustrated. Disc 50a at the bottom of the exploded perspective view in Figure 7 may be considered the bottom disc in the filter element. Disc 50b is identical to disc 50a but is rotated 90° in a counterclockwise direction from the position of disc 50a. The spacer sector 52 of disc 50b overlies the filter sector 53a of disc 50a. Similarly, the discharge sector 54 of disc 50b overlies the filter area 53 of disc 50a. Disc 50c is placed on disc 50b but is also rotated 90° from the position of disc 50b. Spacer sector 52 of disc 50c, consequently, overlies filter sector 53a of disc 50b. Disc 50d is similarly rotated 90° in a counterclockwise direction from the position of disc 50c, and disc 50a at the top of the series illustrated in Figure 7 occupies a position corresponding to disc 50a at the bottom of the series in Figure 7.

Figure 8 shows a disc corresponding to disc 50a in position on top of a disc 50d which is shown in phantom. The position of the several sectors of a disc in relation to an adjacent disc is clearly indicated.

It is apparent that in outside-in filtration the fluid will enter the channels 55 in the spacer sector 52 of disc 50a and thereby come in contact with the filter sector 53 of disc 50b. The pressure on the outside of the filter element will cause the fluid to flow through filter sector 53 and into the channels 60 of the discharge sector 54 of disc 50c. The fluid is then free to flow through the central bore of the filter element to the filter outlet. Some of the fluid will, of course, flow directly through the rim 59 and the rim 56 to the central bore of the filter cartridge. All of the fluid passing through the filter illustrated in Figure 7 must, therefore, pass through the filter material and is clarified therein.

If the structure illustrated in Figure 7 is employed for inside-out filtration, the fluid enters the channel 60 to come in contact with the filtration sector 53. The fluid will then pass through the filtration sector 53 into the channels 57 and then flow to the filter outlet.

It is, of course, possible to vary the areas of the spacer, filter, and discharge sectors of the filter discs to provide the desired sequence of spacer, filter, and discharge sectors in vertical alignment. For example, in Figure 9, the discharge sector 65 may be ⅕ of the total circumference and spacer sectors 66 and 67, each equal to ⅕ of the circumference, positioned adjacent the discharge sector. A filter sector 68 then occupies the remaining ⅖ of the circumference.

When discs having a configuration as stacked, each disc is rotated ⅖ of 360°, or 144° from the position of the disc on which it is placed. The discharge sector of one disc will then overlie the filter sector of the disc lying immediately below. Continued stacking of the disc with the rotation of each disc 144° from the position of the disc on which it rests will provide a filter element in which the order of sectors in vertical alignment is filter sector, discharge sector, filter sector, inlet sector, and inlet sector. This sequence will be repeated throughout the length of the filter element. In this manner a filter element is provided in which the inlet portions have a depth equal to the thickness of two discs.

A novel clarifier has been described herein which employs a filter element constructed of a series of discs of a single type, stacked to form a tubular filter element. The use of discs of a single type greatly simplifies the construction of the filter elements and allows the use of simple automatic stacking machinery in the construction of the filter elements. Important savings in the cost of manufacture of the filter elements is thereby made possible.

One of the modifications of the single type filter discs provides a settling chamber in which the major part of the impurities are separated from the fluid by a settling rather than a filtration procedure. This form of the invention in which the fluid flows from the inside of the filter element to the outside has a dirt capacity much higher than the filters hitherto available.

While the fluid clarifier comprising this invention has been described in detail in relation to specific forms of the invention, it is to be understood that the concept of this invention is not limited to those specific forms, but is limited only by the scope of the appended claims.

I claim:

1. Apparatus for the filtration of liquids comprising identical discs of filter material stacked to form a tubular cartridge having a central opening, each of the discs having a continuous outer annulus with a web extending inwardly from the annulus over a minor sector of the disc, said web extending inwardly to the central opening, and the inner end of the web defining a portion of the central opening, said discs stacked with the outer annuli in vertical alignment and in continuous contact with the adjacent annuli, the discs being oriented with the web of one disc rotated from the webs of adjacent discs through an angle slightly less than the angle of the sector of the web to provide a continuous shelf extending the length of the cartridge within the outer annuli on which contaminants are deposited from the liquid during filtration, means engaging the ends of the cartridge to prevent flow of liquids therearound, and conduit means communicating with the central opening for the delivery of unfiltered liquid thereto whereby in operation liquid flows outwardly through the filter cartridge.

2. Apparatus for the filtration of liquids comprising identical discs of filter material stacked to form a tubular cartridge having a central opening, each of the discs having a continuous outer annulus with a web extending inwardly from the annulus over a minor sector of the disc, said web extending inwardly to the central opening, and the inner end of the web defining a portion of the central opening, said discs stacked with the outer annuli in vertical alignment and in continuous contact with the adjacent annuli, the discs being oriented with the web of one disc angularly displaced from the position of the webs of adjacent discs to provide a shelf extending inwardly from the outer annuli on which contaminants are deposited, means engaging the ends of the cartridge to prevent flow of liquids therearound, and conduit means communicating with the central opening for the delivery of unfiltered liquid thereto whereby in operation liquid flows outwardly through the filter cartridge.

SOUTHWICK W. BRIGGS.

REFERENCES CITED

The following references are of record in the file of this patent:

UNITED STATES PATENTS

| Number | Name | Date |
|---|---|---|
| 1,694,939 | Heftler | Dec. 11, 1928 |
| 2,359,475 | Gauthier | Oct. 13, 1944 |